US011461162B2

(12) United States Patent
Chen et al.

(10) Patent No.: US 11,461,162 B2
(45) Date of Patent: Oct. 4, 2022

(54) MAZE-DRIVEN SELF-DIAGNOSTICS USING REINFORCEMENT LEARNING

(71) Applicant: RINGCENTRAL, INC., Belmont, CA (US)

(72) Inventors: Chunzhi Chen, Ottawa (CA); Guo Rong Zheng, Kanata (CA); Kenneth Armstrong, Woodlawn (CA)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 16/921,148

(22) Filed: Jul. 6, 2020

(65) Prior Publication Data
US 2022/0004448 A1 Jan. 6, 2022

(51) Int. Cl.
| | |
|---|---|
| *G06F 11/00* | (2006.01) |
| *G06F 11/07* | (2006.01) |
| *G06N 20/00* | (2019.01) |
| *G06N 5/04* | (2006.01) |

(52) U.S. Cl.
CPC ........ *G06F 11/079* (2013.01); *G06F 11/0751* (2013.01); *G06N 5/04* (2013.01); *G06N 20/00* (2019.01)

(58) Field of Classification Search
CPC ... G06F 11/079; G06F 11/0751; G06N 20/00; G06N 5/04
See application file for complete search history.

(56) References Cited

U.S. PATENT DOCUMENTS

| | | | |
|---|---|---|---|
| 7,620,612 B1* | 11/2009 | Vijendra | G06F 11/079 |
| | | | 706/16 |
| 9,069,737 B1 | 6/2015 | Mwangi et al. | |
| 9,679,258 B2 | 6/2017 | Mnih et al. | |

(Continued)

OTHER PUBLICATIONS

S. R. K. Branavan, et al.; "Reinforcement Learning for Mapping Instructions to Actions"; Journal, Proceedings of the Joint Conference of the 47th Annual Meeting of the ACL and the 4th International Joint Conference on Natural Language Processing of the AFNLP; Aug. 2009; 9 pgs.

(Continued)

*Primary Examiner* — Jonathan D Gibson
(74) *Attorney, Agent, or Firm* — Finnegan, Henderson, Farabow, Garrett & Dunner, LLP

(57) ABSTRACT

Systems and methods are provided for automatedly troubleshooting a computing application (e.g., a cloud-based computing application). An application domain of the computing application is modeled as a two-dimensional array of cells, a first dimension of the array representing components or microservices of the application domain, and a second dimension of the array representing states of the components or microservices, the array including paths between pairs of cells in the array. A troubleshooting goal is defined as a target state of the application domain, the target state corresponding to a target cell in the array. An initial state of the application domain is also provided, the initial state corresponding to an initial cell in the array. A reinforcement-learning-trained machine-learning algorithm can determine a solution path in the array between the initial cell and the target cell. Divergence between a failure case and a solution path indicates a probable failure cause.

17 Claims, 8 Drawing Sheets

(56) References Cited

U.S. PATENT DOCUMENTS

| | | | |
|---|---|---|---|
| 2010/0083054 A1* | 4/2010 | Marvasti | G06F 11/0709 714/47.2 |
| 2011/0154367 A1* | 6/2011 | Gutjahr | G06F 11/079 719/316 |
| 2011/0288837 A1* | 11/2011 | Blevins | G05B 17/02 703/6 |
| 2017/0024662 A1* | 1/2017 | Warn | G06N 3/0445 |
| 2020/0065666 A1* | 2/2020 | De Magistris | G06N 3/04 |
| 2020/0120000 A1 | 4/2020 | Srinivasan et al. | |
| 2021/0042180 A1* | 2/2021 | Sutton | G06F 11/3452 |
| 2021/0174245 A1* | 6/2021 | Lewis | G06N 3/088 |
| 2021/0303381 A1* | 9/2021 | Baldassarre | G06N 20/00 |
| 2021/0390010 A1* | 12/2021 | Moessle | G06F 16/242 |
| 2022/0050736 A1* | 2/2022 | Khorasgani | G06N 20/00 |

OTHER PUBLICATIONS

Silver, "Lecture 1: Introduction to Reinforcement Learning"; RL Course by David Silver, A summary of 15 hours into reinforcement learning; https://medium.com/biffures/rl-course-by-david-silver-lectures-1-to-4-7667608bf7d3; Mar. 18, 2018; 46 pgs.

Helmut Petritsch, "Service-Oriented Architecture (SOA) vs. Component Based Architecture"; Article, Science and Education; http://petritsch.co.at/download/SOA_vs_component_based.pdf; Jul. 2014; 14 pgs.

European Patent Application and Search Report, No. EP 3 937 017 A1, Title: MAZE-Driven Self-Diagnostics Using Reinforcement Learning, Nov. 24, 2021, SEE pp. 23-25.

Ikeuchi Hiroki et al. "Root-Cause by User Diagnosis Using Logs Generated by User Actions", 2018 IEEE Global Communications Conference (Globecom), IEEE, Dec. 9, 2018 (Dec. 9, 2018), pp. 1-7.

* cited by examiner

400

| | State column 1 | State column 2 | State column 3 | State column 4 | State column 5 | ... | State column M |
|---|---|---|---|---|---|---|---|
| Microservice 1 | 402 | | | | | | |
| Microservice 2 | | | | | | | |
| Microservice 3 | | | | | | | 404 |
| ... | | | | | | | |
| Microservice N | | | | | | | |

| | 1 | 2 | 3 | 4 | 5 | 6 | 7 |
|---|---|---|---|---|---|---|---|
| Media API | /sipcall | CallRequest | QueueCall | /qcall | | | |
| Call Engine | | | | | | | |
| Sip Proxy | Invite | | new branch | | Incoming Branch | | |
| Voice Service | CallRoute | | Ring-Ready | | QUEUED | | |
| Media Server | | Offer | | Answer | | Creating new call | Called RTPENGINE audio over RTP/SAVP |

| | 1 | 2 | 3 | 4 | 5 | 6 | 7 |
|---|---|---|---|---|---|---|---|
| Media API | /sipcall | | QueueCall | /qcall | | | |
| Call Engine | | CallRequest | | | | | |
| Sip Proxy | Invite | | new branch | | Incoming Branch | | Called RTPENGINE |
| Voice Service | CallRoute | | Ring-Ready | | QUEUED | | |
| Media Server | | Offer | | Answer | | Creating new call | audio over RTP/SAVP |

FIG. 7

| | 1 | 2 | 3 | 4 | 5 | 6 | 7 |
|---|---|---|---|---|---|---|---|
| Media API | /sipcall | | QueueCall | /call | | | |
| Call Engine | | CallRequest | | | | | |
| Sip Proxy | Invite | | new branch | | Incoming Branch | | Called RTPENGINE |
| Voice Service | CallRoute | | Ring-Ready | | QUEUED | | |
| Media Server | | Offer | | Answer | | Creating new call | audio over RTP/SAVP |

| State | Up | Down | left | Right |
|---|---|---|---|---|
| (1,1) | 0 | 0 | 0 | 100 |
| ... | | | | |
| (1,3) | 0 | 100 | 0 | 0 |
| (2,4) | 0 | 100 | 0 | 0 |
| (3,3) | 0 | 50 | 0 | 50 |
| ... | | | | |
| (5,6) | 0 | 0 | 0 | 100 |

FIG. 8

| | 1 | 2 | 3 | 4 | 5 | 6 | 7 |
|---|---|---|---|---|---|---|---|
| Media API | /sipcall | | /queueCall | /qcall | | | |
| Call Engine | | CallRequest | new branch | | Incoming Branch | | |
| Sip Proxy | Invite | | Ring-Ready | | | | Called RTPENGINE |
| Voice Service | CallRoute | | | | QUEUED | | |
| Media Server | | Offer | | Answer | | Creating new call | audio over RTP/SAVP |

FIG. 9

MAZE-DRIVEN SELF-DIAGNOSTICS USING REINFORCEMENT LEARNING

TECHNICAL FIELD

The present invention relates generally to automated diagnosis of failures in computing environments, including cloud-based computing environments, and specifically to methods and systems for maze-driven self-diagnostics using reinforcement learning.

BACKGROUND

A component is a unit of a software program that is independently replaceable and upgradeable. For example, a library is a component that is linked into a software program and called using in-memory function calls. Services, by contrast, are independently deployable, out-of-process components that communicate via a mechanism such as a web service request, or a remote procedure call.

In the context of cloud-based computing, microservices are small, independent services that communicate over well-defined application programming interfaces (APIs). A cloud-based software application or service may consist of hundreds or potentially thousands of microservices working together to process inputs to provide outputs. Microservices are generally single-purpose services that each perform only a single, very narrow software function. Consequently, the functioning of a microservice can be much better understood by its human maintainer(s) (e.g., a single software developer or team of developers) who "own" the microservice and/or one or more support professionals who may be tasked with troubleshooting the microservice, in contrast to the case of a monolithic architecture in which a large number of software functions are performed by a single codebase. Beneficially, so long as the forms of a microservice's inputs and outputs are not substantially altered, or otherwise fall within evolution parameters defined by a service contract, the micro service may be modified or completely redesigned and hot-swapped in an active functioning cloud computing application without detrimentally impacting the functioning of the application (e.g., by imposing requirements that other components of the system also be modified to accommodate the change in the microservice), and without causing substantial downtimes to the system.

Machine learning (ML) algorithms fall into one of several categories, including supervised learning, unsupervised learning, semi-supervised learning, and reinforcement learning. The first three types of ML algorithms can be used to learn the relationship between input data and a target value. For example, given a set of photos as input data, to find as a target value the locations of green, yellow, or red traffic lights in the photos. These first three types of machine learning are best suited for prediction or classification. As an example, they can give answers to yes or no questions. For example, a question might be: based on data in a social network user profile, will a given user be likely to be interested in a certain advertised product? By contrast, reinforcement learning (RL) aims at using observations gathered from interaction with a defined environment to take actions within the environment that maximize a defined reward or minimize a defined risk while moving through a series of states to reach a final state. A reinforcement learning algorithm (which can be executable instructions referred to as an "agent") can continuously learn from the environment in an iterative fashion. In the process, the agent learns from its experiences of the environment by exploring a range of states within the environment, and possibly until it explores the full range of possible states that exist within the environment. Reinforcement learning has been used, for example, to train automated systems to play games. Methods and apparatus for reinforcement learning are described, for example, in U.S. Pat. No. 9,679,258 B2, issued Jun. 13, 2017, which is herein incorporated by reference.

SUMMARY

One example includes a method of troubleshooting a computing system. An application domain of a computing system is modeled as a two-dimensional array of cells, a first dimension of the array representing components or microservices of the application domain, and a second dimension of the array representing states of the components or microservices, the array including paths between pairs of cells in the array. A troubleshooting goal is defined as a target state of the application domain, the target state corresponding to a target cell in the array. An initial state of the application domain is provided, the initial state corresponding to an initial cell in the array. A reinforcement-learning-trained machine-learning algorithm is then used to determine at least one solution path in the array between the initial cell and the target cell.

Another example includes a troubleshooting system for troubleshooting a computing system. The troubleshooting system includes one or more computer processors coupled to a non-transitory memory storing instructions. When executed by the one or more computer processors, the instructions model an application domain of a computing system as a two-dimensional array of cells, a first dimension of the array representing components or microservices of the application domain, and a second dimension of the array representing states of the components or microservices, the array defining paths between pairs of cells in the array. The instructions define a troubleshooting goal as a target state of the application domain, the target state corresponding to a target cell in the array. The instructions then provide an initial state of the application domain, the initial state corresponding to an initial cell in the array. The instructions apply a reinforcement-learning-trained machine-learning algorithm to determine at least one solution path in the array between the start cell and the target cell.

Yet another example includes one or more computer-readable media configured to provide a computer as the system set forth above, or to execute in conjunction with a computer the method set forth above. Such an example can include one or more non-transitory computer-readable media storing instructions that, when executed by a processor, cause the processor to model an application domain of a computing system as a two-dimensional array of cells, a first dimension of the array representing components or microservices of the application domain, and a second dimension of the array representing states of the components or microservices, the array defining paths between pairs of cells in the array. The instructions further cause the processor to define a troubleshooting goal as a target state of the application domain, the target state corresponding to a target cell in the array. The instructions further cause the processor to provide an initial state of the application domain, the initial state corresponding to an initial cell in the array. The instructions further cause the processor to use a reinforcement-learning-trained machine-learning algorithm to determine at least one solution path in the array between the start cell and the target cell.

BRIEF DESCRIPTION OF THE DRAWINGS

FIG. 4 illustrates the form of a 2-dimensional table that can be used to generate mazes.

FIG. 5 is an example maze that uses the form illustrated in FIG. 4.

FIG. 6 shows a first example solution to the example maze of FIG. 5.

FIG. 7 shows a second example solution to the example maze of FIG. 5.

FIG. 8 is an example Q-table.

FIG. 9 shows an example failure case in the example maze of FIG. 5.

DETAILED DESCRIPTION

Figure 1:
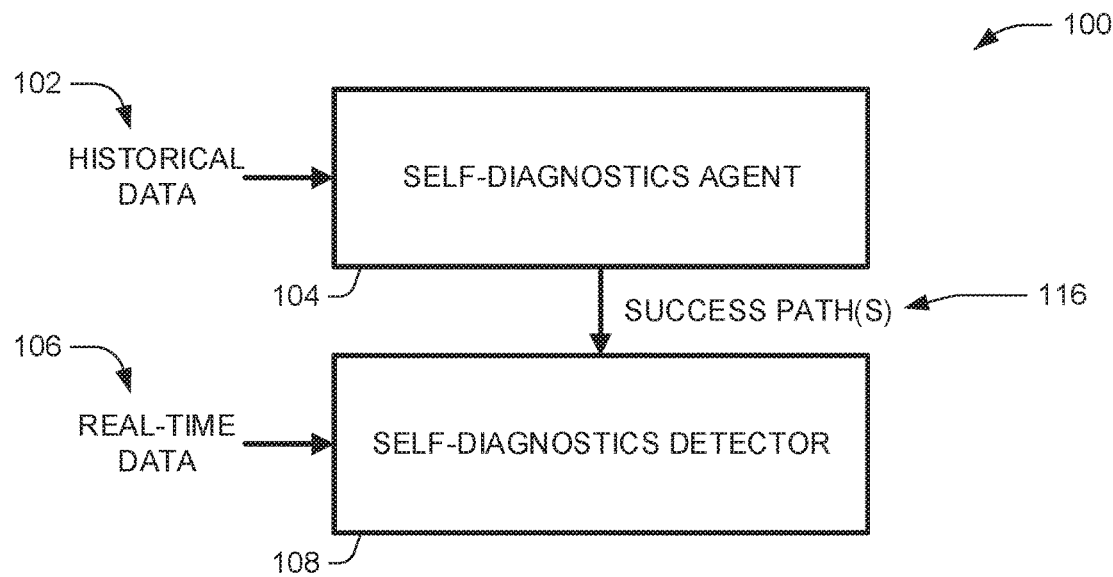
FIG. 1 is a block diagram of an example maze-driven self-diagnostics system.

In development and deployment of a software application that is based on a plurality of components or, in the context of cloud-based computing, microservices, troubleshooting can be used to discover the reasons why the application does not work as intended, that is, why such troubleshooting does not produce the expected outputs when provided with the given inputs. The difficulty of troubleshooting a software application domain that uses components or microservices increases with the complexity of the system. For example, the complexity of the system may be proportional to the project size as measured by the number of components or microservices included in the cloud architecture and the variety of different states that can be taken on by the components or microservices.

In a typical troubleshooting arrangement, a developer or support professional is assigned only particular aspects of the project or deployed product and thus may fully understand only a limited portion of what may be a very complicated application. In time, developers or support personnel may gain expertise in their respective assigned areas, and thus may be able to understand why a single component or microservice, or a group of related components or microservices, does not function as desired. Resultantly, it may be that no one person or group understands the entire software application, and thus, no one person or group is capable of effectively troubleshooting the application. The learning process used to train such support personnel and the tools used to troubleshoot problems generally rely on key troubleshooting knowledge being recorded at least in part as human-readable text documentation stored in a knowledge base. Essentially, each time a new problem with a complicated architecture is encountered and solved, searchable notes on the problem and its solution can be documented as human-readable text in the knowledge base. Provided the problem is recognized in the same language terms by a subsequent developer or support professional, the knowledge base can be searched for troubleshooting solutions upon future occurrences of the same or a similar problem.

However, as cloud-based systems and problems that arise out of their functioning become more complex, the distributed nature of the cloud poses troubleshooting challenges because of the number of microservices involved, requiring specialized knowledge of the framework and the respective service environments. Additionally, each change to a microservice, to the overall architecture, or to the operating environment(s) may render past collected documentation incomplete or obsolete. Similar challenges are posed by complex component-based systems.

The knowledge-based approach to troubleshooting, currently employed by most product support teams, lacks benefits that could be provided by a more general and more automated approach to systematic self-diagnostics. Knowledge accumulation is limited by knowledge acquisition through this traditional approach, which requires active human participation of a support professional or software developer. The familiarity of a developer or support professional may be limited to just parts of the system, which may slow down the accumulation of knowledge or inhibit access to the portions of the knowledge base needed to troubleshoot a recurring or related problem with the functioning of a software application.

The systems and methods described herein accordingly provide a self-diagnostics service that can run automatically to determine the potential root cause of a failure condition, thereby requiring reduced (if any) human intervention. For example, in a product support context, the troubleshooting service may simply send a notification (e.g., an e-mail or other type of direct message) to a developer or support professional with an identified failure reason, rather than relying upon a human to detect and diagnose a failure in a component- or microservice-based architecture.

Maze-driven self-diagnostic systems and methods, as described herein, implement a path-finding diagnostic process, such as may be considered akin to solving a maze. Path-finding within a maze further may utilize reinforcement learning. Such reinforcement learning can solve problems through a feedback system of rewards and penalties and can be applied on a cloud system where the maze-solving method (e.g., program code) moves through a series of unsolved states (e.g., of the various components or microservices utilized by the application) in order to reach a pre-defined final state corresponding to a reference model's success state.

The functioning of a maze-driven self-diagnostic system or method can be analogized to mice in a maze in that the maze-driven system or method tries to find a best path through a two-dimensional array of states (the "maze") by leveraging historical data until it solves the maze ("finds the cheese"). The maze-driven self-diagnostic system or method thus takes a serial approach to failing over and over until a solution to the problem is found. The patterns of success and failure are tracked, where each state results in the accumulated sum of rewards: statistically greater importance is given to reward events, so that whenever the troubleshooting system or method detects a goal achieved, the troubleshooting system or method is also simultaneously enduring penalties to learn.

As an example, the described maze-driven self-diagnostic systems or methods can generate a model to represent a software system's components or microservices as a maze construct that is stored in memory and accessible for the purposes of troubleshooting. A maze-driven self-diagnostic system or method can then apply a reinforcement learning method to the maze construct to find one or more success paths in the maze by training the reinforcement learning method based on historical data. A failure case can be likened to a failed attempt to solve a maze, which ended up "getting stuck" or coming to a dead end. Once the troubleshooting system or method has solved the maze to determine at least one success path in the maze, for any failure case, the maze-driven self-diagnostic system or method can compare the results of the failure case with the one or more determined success paths in the maze. The system or method can report the first detected difference between the failure case and the one or more determined success paths as a potential cause of the failure.

The described maze-driven self-diagnostic systems or methods can be used in a variety of product support situations where contact centers are over-burdened and knowledge bases are strained to the point that the static build-up of content requires huge learning curves for the human support agents. The described maze-driven self-diagnostic systems or methods can be especially effective in troubleshooting a software product involving numerous components or microservices. An example of such a software product is telephony or videoconferencing application that works to connect a caller to a call or conference through such components or services as a media API, a call engine, a session initiation protocol (SIP) proxy, a voice service, and a media server, each of which may have a number of states.

Prediction-based machine learning, for example, supervised learning, unsupervised learning, or semi-supervised learning, may not be capable of solving the problem of troubleshooting in the context of a microservices-based cloud computing application. Reinforcement learning, by contrast, is capable of using input data to act as an agent to find a target value that represents a success state. The systematic choosing of an action given the available inputs to the system (e.g., in the case of a maze, the choice to move up, down, left, or right) is guided by a rewards structure.

At the outset of troubleshooting a problem in a complex computing system, there may be no evidence identifying the failure point in the complex computing system, which failure point could be at one of any number of states of one of any number of the components or microservices that make up the computing system. To identify the failure point, the maze-driven self-diagnostic systems or methods described herein may model the states of the computing system's components or microservices as a maze, and use reinforcement learning to find a success state within the maze and a success path consisting of all states visited between a start state and the success state. By examining the success path, and replaying with a failure case, the maze-driven self-diagnostic systems or methods find the first difference between the success path and the failure state as potential point of failure in the system. After training a self-diagnostics agent on the maze to determine at least one success path, a self-diagnostics detector may use replaying, which requires comparatively very little in terms of computing resources, to automatically target a potential cause of a problem in a software application.

FIG. 1 illustrates an example maze-driven self-diagnostics system 100 that includes a self-diagnostics agent 104 and a self-diagnostics detector 108. In some examples, agent 104 and detector 108 may be implemented in software as machine-readable instructions stored on one or more non-transitory computer-readable media executable by one or more general-purpose computer processors. In other examples, agent 104 and detector 108 can be implemented in hardware as an application-specific integrated circuit (ASIC) or using a digital signal processor (DSP) or a field-programmable gate array (FPGA). In an example, either or both of the agent 104 and the detector 108 can be implemented as a function as a service (FaaS), e.g., using an Amazon Web Services (AWS) Lambda function as a microservice. A FaaS is a small piece of code deployed to a cloud computing service provider (e.g., as a ZIP file) and linked to a specific type of event (e.g., a queue or an HTTP endpoint). Examples of functions as a service include AWS Lambda functions, Microsoft Azure functions, Google Cloud functions, and IBM Cloud functions. AWS Lambda is a serverless compute service that can run a FaaS (a Lambda function) in response to software events and can automatically manage the underlying compute resources. The self-diagnostics agent 104 can be configured to find one or more success paths 116 through a maze representative of a software application, based on historical data 102 upon which the self-diagnostics agent 104 is trained. The historical data 102 contains successful cases, i.e., solved mazes having success paths that proceed from an initial state to a success state while traversing one or more other visited states. As described in greater detail below, a maze in this context can be modeled as a two-dimensional array of states of a variety of state machines such as components or microservices, with each row in the array corresponding to a different component or microservice. System 100 can therefore be a stimulus-system that can include RL logic similar to RL logic used in video game bots that repeatedly play until a game end, learning from the outcome with each play.

Self-diagnostics agent 104 can, for example, be configured to compute a policy function from which a success path through the maze 116 may be derived. A policy function is used to find the maximum rewards based on given states and actions. The policy function can be determined, for example, by computing, over all possible actions, the arguments of the maxima (argmax) of a best utility function (also known as a best quality function) that defines, for any given action and for any given state, the maximum total reward possible by choosing the given action in the given state. For example, the best utility function should satisfy the Bellman equation and can be approximated by building a neural network that accepts a state as its input and outputs a vector of Q-values (a "Q-table") corresponding to the number of possible actions (moves within the maze). A reward is given when there is found a matching state defined in the two-dimensional array (the troubleshooting maze). The pre-defined final state is the goal of the troubleshooting maze. The self-diagnostics agent 104 moves from the starting point in the maze based on boundaries that are, in turn, based on the detected problem parameters (e.g., the goal) and to collect rewards. The neural network can, for example, be trained after each move by injecting a random selection of the most recent training samples into the neural network, such that the neural network converges to define a best utility function that satisfies the Bellman equation. In each iteration, the values in Q-table can be updated. The Q-table can be used to find the policy function. When a goal is reached, a success path 116 is created. This success path 116 corresponds to the sequence of component or microservice states of the maze traversed by the neural network in a successful operation scenario based on the goal and training data gathered from a provider's cloud system.

Provided with one or more success paths 116 from the self-diagnostics agent 104, the self-diagnostics detector 108 can be configured to replay a failed case, as may be supplied in real-time data 106, to find a potential failure reason by comparing the replay of the failed case to the one or more success paths 116 of the solved maze supplied by the self-diagnostics agent 104. A failure case, by definition, does not match any determined success path, and instead corresponds to a path that deviates from all determined success paths. The self-diagnostics detector 108 can use a failure case to replay on the maze to find the first such difference between the failure case and the success paths. The first state reached in the failure case that is not along any determined success path can be diagnosed and reported as a probable reason for a detected failure of the software application.

Thus, as described above, the maze-driven self-diagnostic systems and methods make use of the above-described maze construct represented by a two-dimensional array of component or microservice states for a troubleshooting process that searches for a success path and compares a failure state to the success path to determine a likely point of failure. As described in greater detail below, the maze-driven self-diagnostic systems and methods can also the expand the two-dimensional maze when a failure reason cannot be found, to determine if re-training on the expanded maze results in the finding of a failure reason.

Figure 2:
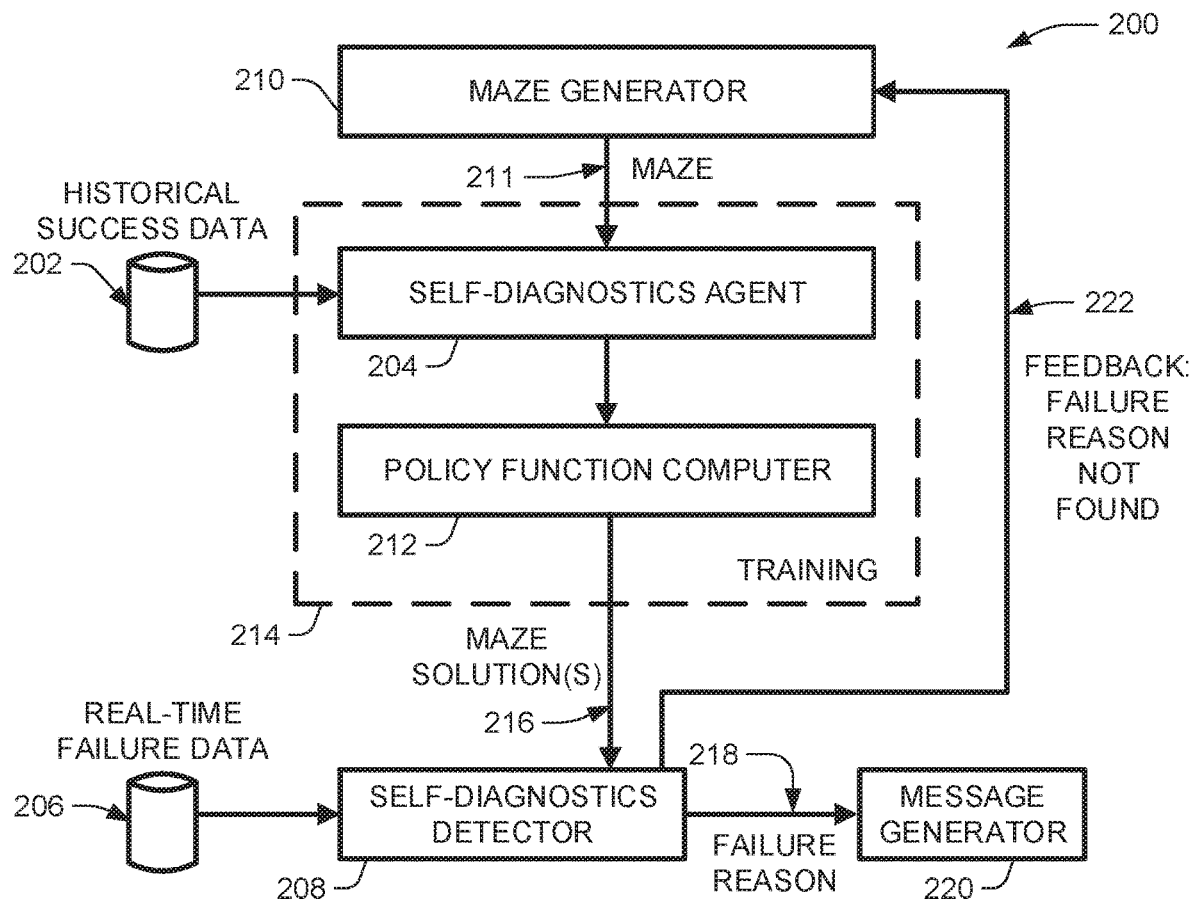
FIG. 2 is a block diagram of another example maze-driven self-diagnostics system.

FIG. 2 shows another example maze-driven self-diagnostics system 200. A maze generator 210 is configured to construct, from the states of components or microservices of a software application, a two-dimensional maze 211 representative of the software application. For example, the generated maze 211 can consist of rows corresponding to the respective components or microservices and columns having cells filled—although not necessarily completely filled—with states of the components or microservices of the corresponding rows. In the initial maze generation (e.g., by maze generator 210), it may be that not all of the components or microservices utilized by the software application are included as rows in the maze. Rather, in some examples, only a subset of the implicated components or microservices—e.g., those quantified or labeled as being most significant to the operation of the application—are included as rows in the maze 211. Likewise, it may be that, at least initially, not all states of the included components or microservices are placed within cells of the generated maze 211. Maze generator 210 may select a subset of most important states for inclusion. However, if necessary, maze generator 210 may later add additional components or microservices and/or additional states to expanded iterations of the maze 211, as described in greater detail below with respect to FIG. 11.

Maze generator 210 may order the rows of the maze 211 with respect to each other based at least in part according to a hierarchy of the components or microservices or a logical relationship of data flow between them. For example, if a first component or microservice is required to process data before passing it to a second microservice, the maze generator 210 can order the first microservice above the second microservice in the generated maze 211. Similarly, the ordering of the placement of component or microservice states in the columns of the maze may be dictated by timestamps of log messages, such that earlier-invoked states are always placed to the left, for example, of later-invoked states. Each component or microservice is a state machine that runs through its states in some defined sequence, which sequence should be preserved in the ordering of the placed states with respect to each other, right-to-left (or left-to-right, as the case may be) within the generated maze 211. States need not be placed in adjacent cells in the maze 211 and, in general, maze generator 210 can be configured to place states selected for inclusion in the initially generated maze 211 with some empty-cell spacing between placed states, so as to accommodate later insertion of additional states that may fall in time in between initially included states of a particular included component or microservice. Thus, maze generator 210 may place states randomly within the generated maze 211, so long as states are placed within the row corresponding to their associated component or microservice, and so long as the time-order with respect to each other is preserved left-to-right or right-to-left within the maze 211.

The maze generator 210 provides the generated maze 211 to self-diagnostics agent 204 in training module 214, which can be an RL system trained on historical data 202 (provided, e.g., from a database) to solve the provided maze 211. One or more policy functions from which one or more success paths through the maze 211 may be derived can be computed by policy function computer 212. The one or more success paths represent solutions 216 to the maze 211 and are provided to self-diagnostics detector 208. Real-time data 206 representing a failure of the software application is also provided to self-diagnostics detector 208. The software application might be, for example, an Internet telephony or videoconferencing application and the failure data 206 might represent a failure to connect a call. The self-diagnostics detector 208 is configured to replay the failure case on the solved maze and to note at which state, in which component or microservice, in the path through the maze, the failure diverges from the solution(s) 216 to the solved maze. This first difference between the failure case and the maze solution(s) 216, that is, this divergence point, can be indicative of a probable failure reason 218 that identifies the particular component or microservice that may be the cause of the problem and the state of that component or microservice likely to be associated with the failure.

Self-diagnostics detector 208 provides the identified failure reason 218 to message generator 220. Responsive to receiving the determined failure reason 218, a message generator 220 can generate a failure message indicating the failure point. This failure message can, as examples, take the form of an e-mail or other type of direct message (e.g., SMS message, or social media network or internal network direct message) addressed, for example, to one or more software developers or support professionals, who may use the failure information contained in the message as the basis for an investigation and possible corrective action, as by restarting, rewriting, or replacing the determined faulty component or microservice to address the failure. In some instances, the failure message can further include a proposed solution suggestion, where the solution is known (e.g., stored in a database) or may be automatically determined (e.g., artificial intelligence methods).

In the event that self-diagnostics detector 208 finds no failure reason 218, self-diagnostics detector 208 can transmit a feedback signal 222 to maze generator 210, indicative that a failure reason has not been found. Responsive to the feedback signal 222, the maze generator 210 can then re-generate the maze 211, e.g., in part by adding one or more additional columns to the previously generated maze 211. After maze re-generation, the training module 214 can solve the new maze 211 based on historical success data 202, and the policy function computer can submit the newly generated success path(s) 216 to the self-diagnostics detector 208. If it is still the case that no failure reason is found, the system 200 can repeat the process of maze regeneration and solution either until a timeout occurs, a maximum retry number has been reached, or until the maze expansion has been exhausted (e.g., by the exhaustive inclusion of every component or microservice state of the software application into the maze).

Figure 3:
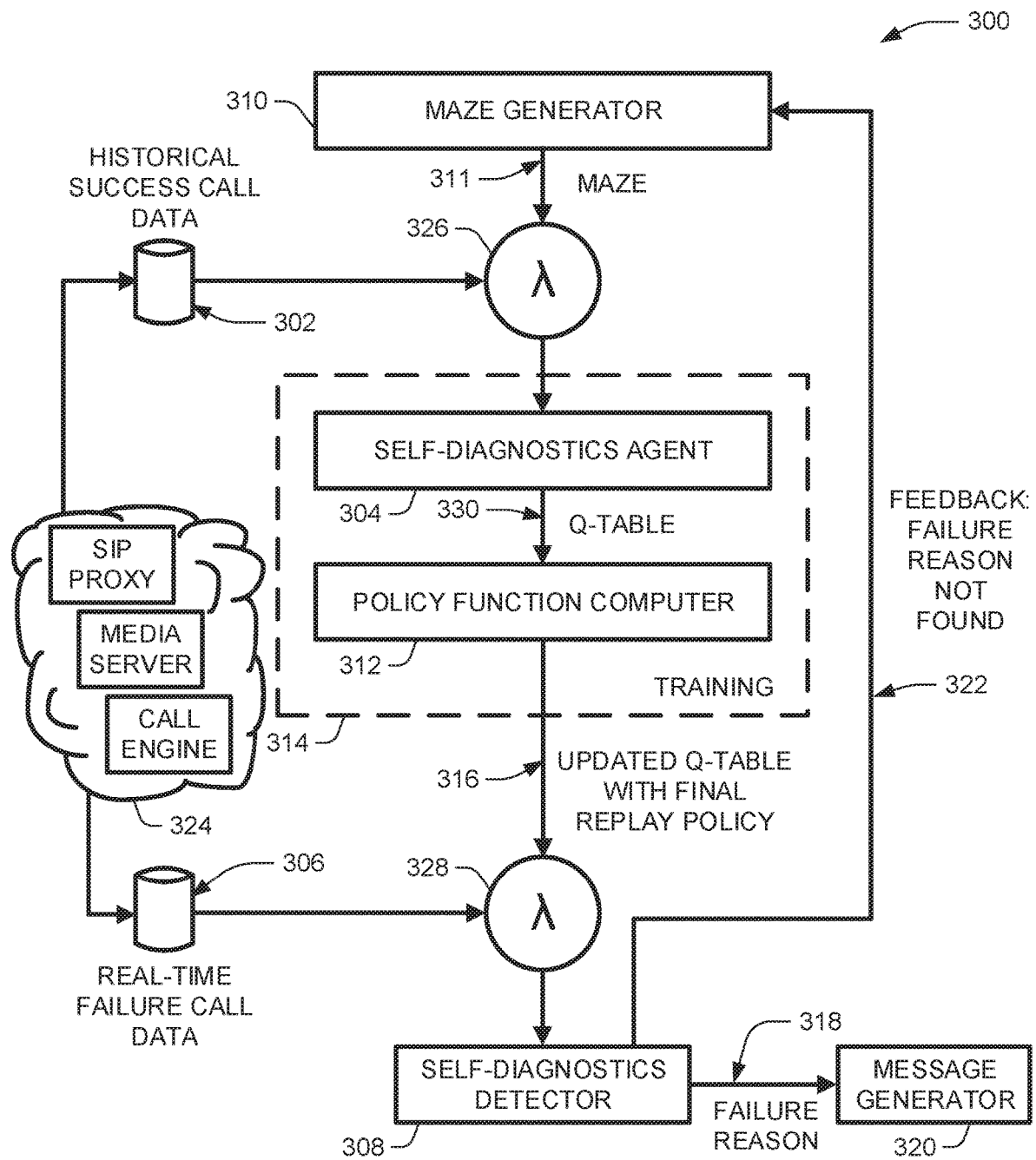
FIG. 3 is a block diagram of an example maze-driven self-diagnostics system.

FIG. 3 shows another example maze-driven self-diagnostics system 300 that operates to troubleshoot a cloud-based telephony or videoconferencing application. For example, maze-driven self-diagnostic system 300 is programmed to determine why a call failed to be connected or was erroneously disconnected. In other examples, maze-driven self-diagnostic system 300 may be utilized troubleshoot other scenarios. A maze generator 310 is configured to construct, from the states of microservices of the telephony or videoconferencing application, a two-dimensional maze 311 representative of the application, as described above with respect to maze generator 210. Maze generator 310 provides a first FaaS 326 (e.g., a Lambda function) with the generated maze and with historical success call data 302 stored in a database and derived from the cloud 324 that includes various microservices of the telephony or videoconferencing application. In this example, the microservices include a session initiation protocol (SIP) proxy, a media server, and a call engine. The FaaS 326 calls an RL self-diagnostics agent 304 in training module 314, which trains on the historical success call data 302 to solve the generated maze 311, thereby generating a Q-table 330. The agent 304 provides the Q-table 330 to a policy function computer 312 to provide one or more policy functions responsive to the Q-table 330, from which the policy function computer 312 derives one or more success paths through the maze 311. Policy function computer 312 provides an updated Q-table with a final replay policy 316 to a second FaaS 328 (e.g., a Lambda function), which is also provided with real-time failure call data 306 derived from the cloud 324, e.g., derived from log files generated by the cloud-based software application. The self-diagnostics detector 308 is configured to replay the call failure from the real-time failure call data 306 on the solved maze and to note at which state, in which microservice, in the path through the maze, the failure case diverges from the solution(s) to the solved maze. The self-diagnostics detector 308 can utilize this divergence point, that is, this first detected difference between the failure case and the solution path(s) to provide a probable failure reason 318, which may also identify the particular microservice that may be the cause of the problem and the state of that microservice likely to be associated with the failure.

Responsive to receiving the determined failure reason 318, a message generator 320 can generate a failure message indicating the identified failure reason 318. This failure message can, as examples, take the form of an e-mail or other type of direct message addressed to one or more software developers or support professionals, who may use the failure information contained in the message as the basis for an investigation and possible corrective action, as by re-writing or replacing the determined faulty microservice to address the failure. In some instances, the failure message can further include a proposed solution suggestion, where the solution is known (e.g., stored in a database) or may be automatedly determined (e.g., artificial intelligence methods).

In the event that no failure reason 318 is found, self-diagnostics detector 308 can transmit a feedback signal 322 to maze generator 310, indicative that a failure reason has not been found. The maze generator 310 can then re-generate the maze 311, e.g., in part by adding one or more additional columns to the previously generated maze. Responsive to maze re-generation, the training module 314 (self-diagnostic agent 304 and policy function computer 312) can solve the new maze and submit the newly generated success path(s) to the self-diagnostics detector 308 via FaaS 328. If it is still the case that the self-diagnostics detector 308 finds no failure reason, the system 300 can repeat the process of maze regeneration and solution either until a timeout occurs or until the maze expansion has been exhausted.

In each of the above example systems 100, 200, 300, the troubleshooting goal may be set as a pre-defined final state desired to be achieved, which effectively corresponds to a cell in the maze array analogous to a "cheese" location in a maze. This final state will depend on the particular application being troubleshot. That is, the troubleshooting goal generally aligns with the main purpose of the software application. In a telephony application, for example, where the goal is to connect and maintain a call, the desired final state can be represented by successful audio flow over a media server, that is, a media server component or microservice state of "audio over real-time transport protocol/secure audio video profile (RTP/SAVP)". The maze may also include an initial state corresponding to a starting state of the application. In a telephony application, for example, where the goal is to connect a call, the initial state may be the initiation of a call connection attempt with a /sipcall state of a media API.

In the systems and methods described herein, troubleshooting a problem involves representing functional dependencies or components in a cloud-based application as parts in a maze. Responsive to being provided with information about such functional dependencies or components, maze generator 210 or 310 can convert a troubleshooting scenario into a maze construct for deterministic argumentation by modeling the application domain as a two-dimensional array. One dimension of the array represents the components or microservices of the application. Each cell in the array can represent corresponding states of the components or microservices. Virtually any system aspect that can be controlled using a cloud-based framework (e.g., an AWS framework) can be represented in the array. All states or functions of the components or microservices can be added to the array provided they can be used in executable actions as part of troubleshooting. In addition to representing states of the components or microservices, cells in the array may also represent main variables of each component or microservice, alarms issued by the components or microservices, or logging messages written by such components or microservices. Logging messages can be used in troubleshooting as proof of symptom or proof of running result.

FIG. 4 is an example N×M array template 400 for a maze that can be solved, for example, by systems 100, 200, or 300. Each of the N rows of the array may correspond to a component or microservice of the application being troubleshot. Various states of these components or microservices may be slotted into the cells in the rows. The number of columns M can be set at, for example, at least the number of states of the component or microservice with the most states. However, in some examples, the number of columns M can be set at more than this, e.g., at about twice this number, such that not every cell in a row is occupied by a state. For example, there may be one or more blank cells in between about every state in a given row. The initial state may, for example, be slotted in the top-left cell (1, 1) 402. The desired final state may, for example, be slotted into the bottom-right cell (n, m) 404. In the template maze 400, troubleshooting is used to find a failure point in a path through the array that traverses a variety of states starting with (1, 1) 402 toward (n, m) 404.

A troubleshooting system such as system 100, 200, or 300 can glean information about the states of components or microservices in a software application in order to "fill out" the template of FIG. 4 to generate a maze like the example maze 500 shown in the example of FIG. 500 so as to be able to run a diagnostic autonomously. The troubleshooting system may be configured to obtain information about components or microservices in the software application by being provided with a table of all the components or microservices in the target software system. An example of such a table is shown in Table 1, below, which includes all the microservices of the example of FIG. 3. The table also includes information that can be used to search in corresponding log files. For example, the string "Media_API_xxxx" in a log file is indicative of the "Media API" microservice.

TABLE 1

Example of all configured microservices in an example system

| Microservice Name | Name in Maze | Identity in log | File name of log |
|---|---|---|---|
| Media API | [Same] | Media_API_xxxx | File_Media_API_datetime |
| Call Engine | [Same] | Call_Engine_xxxx | File_Call_Engine_datetime |
| Sip Proxy | [Same] | Sip_Proxy_xxxx | File_Sip_Proxy_datetime |
| Voice Service | [Same] | Voice_Service_xxxx | File_Voice_Service_datetime |
| Media Server | [Same] | Media_Server_xxxx | File_Media_Server_datetime |
| Recording Service | [Same] | Recording_Service_xxxx | File_Recording_Service_datetime |

The troubleshooting system can be configured to glean from log files information about states of the various components or microservices, and thereby to construct a maze that includes such states, using labelling. As an example, based on the configuration information provided in Table 1, in order to build all states of any given microservice specified in the table, the troubleshooting system can determine from the table which file or files corresponding log entries may be loaded from. For example, for the microservice "Media API", the troubleshooting system may load log files with prefix "File_Media_API_". Maze generator 210 or 310 of the system can read log entries from a loaded file (e.g., "File_Media_API_2020_05_01.txt") and search the loaded log entries for those having the identity of the "Media API", which is "Media_API_xxxx". Example results of a such a search may include the following log entries:

"2020-05-01T16:23:29.817Z Media_API_1000: /sipcall started"

"2020-05-01T16:23:29.917Z Media_API_3000: Queue-Call"

"2020-05-01T17:23:29.817Z Media_API_1000: /sipcall started"

"2020-05-01T17:23:29.917Z Media_API_3000: Queue-Call"

"2020-05-01T17:25:29.917Z Media_API_4000: EndCall"

The maze generator 210 or 310 may then extract information from the found log entries having format "Media_API_xxxx". Sorting these results provides the troubleshooting system a list of labels to mark as the states of the "Media API" microservice. An example of such a list is shown in Table 2, below. Although, for the purposes of improved human readability of the illustrations, the example maze 500 illustrated in FIGS. 5-7 and 9 uses the names of the states in the array cells, in practice it may be more computer-readable to use the labels of states in the array cells.

TABLE 2

Example of all states for a microservice, the Media API

| Label of State | Name of State | Description of State |
|---|---|---|
| Media_API_1000 | /sipcall started | /sipcall started |
| Media_API_3000 | QueueCall | Queue Call |
| Media_API_4000 | EndCall | End Call |

The maze generator can sort and collect all states for all configured components or microservices. Table 3, below, shows example gleaned states for the "Recording Service" microservice. These and the states of other microservices can be used to populate the template of FIG. 4 to generate a maze, such as example maze 700.

TABLE 3

Example of all states for the "Recording Service" microservice

| Label of State | Name of State | Description of State |
|---|---|---|
| Recording_Service_1000 | CreateRecordingParticipant | Create Recording Participant |
| Recording_Service_3000 | RecordingParticipantJoined | Recording Participant Joined |
| Recording_Service_4000 | RecordingStarted | Recording Started |

FIG. 5 illustrates an example maze 500 that uses the template 400 of FIG. 4 for the particular example of troubleshooting a call connection in a cloud-based telephony application. The process of connecting a call begins at top-left cell (1,1) with a /sipcall state of a media API microservice. The process successfully completes at bottom-right cell (5, 7) representing a call connected state, "audio over RTP/SAVP". More complex mazes may be generated according to the examples disclosed herein, such as when solving more complex problems. In some examples, the generated maze may potentially have hundreds or thousands of rows and hundreds or thousands of columns. The location within the maze of the placement of the success-state, whether at bottom-right or otherwise, should be indicated or apparent to ensure that a learning process, such as may be executed by self-diagnostics agent 104, 204, or 304 (of FIGS. 1, 2, and 3, respectively), has a defined goal.

The learning process is driven by rewards. A system reward may be given once a valid cell (state) is reached. When using logging in a cell, a reward may be given when a log event is found. In such case, reaching a valid cell should satisfy the condition that the timestamp of a log event argumentatively favors all other timestamps of previously traversed log events. Each cell in the maze's grid may contain a reward with an assigned value (e.g., a reward of value 1) if the cell is marked, that is, if the cell contains a state, as opposed to being left blank. For example, the starting state cell (1,1) in maze 500 of FIG. 5, marked as "/sipcall", may have a reward of 1. Each finding from available log-events in the historical training data can be given a reward of 1. For example, with respect to the cloud-based Call Engine microservice, during the training process, when the self-diagnostics agent process finds "Call-Request" in a success case, the agent can be given a reward of 1. The RL training process uses maximum rewards to guide the process toward finding the goal, which, in the illustrated example, is the bottom-right cell, the seventh column of the row corresponding to the Media Server microservice. No rewards are associated with empty cells in maze 500. An invalid log line may be conceptualized as a "dead end" in a maze, and a path that comes to such a dead end may incur a penalty (negative reward value).

The maze is progressively solved until the learning process can no longer find a failure reason in a failed case (indicating that the system has learned something). This provides the system with the ability to accumulate knowledge. At the outset of the leaning process, the maze construct may be small with very few learned "boundaries". It may subsequently be expanded over time automatically as successful paths through the maze are learned via the learning process.

In the context of an RL solving of a two-dimensional maze, an action can be a move up, down, left, or right in the maze. At each state, the self-diagnostics agent (e.g., agent 204, 304) moves through the array 500, logically working up, down, left, or right to search related logs from different components or microservices of the cloud-based application. Moving left and right through the maze corresponds to finding logs in the same component or microservice. Moving up and down through the maze corresponds to search logs in a different component or microservice.

A training process of an RL solving of a two-dimensional maze is used to find a policy function that describes the relationship between maximum rewards and actions under states. In the training process, the self-diagnostics agent (e.g., agent 104, 204, or 304) can be trained using historical data. The technique that the self-diagnostics agent uses to train is based on applying the action and traversing various respective states in the maze. In an example, the training sub-process can work as follows. The self-diagnostics agent starts from an initial state in the cell represented as (1, 1). This cell is thus the current state $S(x)$, where x is the step in the training process, and $S(x)$ represents the state at the step x. The system (e.g., system 100, 200, or 300) initializes a Q-table with random values. The system uses the current state $S(x)$ to execute an action (e.g., moving up, down, left or right in the maze). Initially, the system randomly chooses an action, or, later on, it may base the process on the trained Q-value table from its neural network. For example, the action taken can be to go in the right direction, meaning the self-diagnostics agent finds a log message in the same component or microservice with the same or correlating call ID. If a same or correlating call ID is found, the agent reaches a new state $S(x+1)$. If, in the new state $S(x+1)$, the timestamp of the found log message is earlier than the timestamp of the log message in the state $S(x)$, this move is an invalid action and can be likened to having reached a "dead end" in a maze. This action should be avoided and may be assigned a negative reward value, that is, a penalty. Any invalid action may be reverted or the maze traversal restarted. When the self-diagnostics agent performs a valid action, the system accrues a reward and the self-diagnostics agent attains the new state $S(x+1)$. The system updates the Q-value table. If final state is met, the system calculates the total of rewards. If not, the system uses the current state $S(x+1)$ to execute a next action, iteratively continuing the training sub-process. By training the self-diagnostics agent with the above-described training sub-process, the algorithm learns for a given state which action obtains a reward and which action should be avoided in order to get maximum rewards until reaching the final state. In the end, the self-diagnostics agent finds a solved path with an updated Q-value table.

FIG. 6 illustrates one example solved path 602 through the maze 500 of FIG. 5, having a reward value of 8, for having traversed eight total states: /sipcall (1, 1), QueueCall (1, 3), CallRequest (2, 2), new branch (3, 3), Ring-Ready (4, 3), Answer (5, 4), Creating new call (5, 6), and audio over RTP/SAVP (5, 7). Multiple valid solution paths may exist in a given maze. FIG. 7 illustrates another example solved path 702 through the maze 500 of FIG. 5, having a reward value of 11, for having traversed eleven total states: /sipcall (1, 1), QueueCall (1, 3), /qcall (2, 4), new branch (3, 3), Incoming Branch (3, 5), Called RTPENGINE (3, 7), QUEUED (4, 5), Ring-Ready (4, 3), Answer (5, 4), Creating new call (5, 6), and audio over RTP/SAVP (5, 7). The training process can be implemented, for example, by using a service from Amazon, such as Amazon SageMaker RL.

The self-diagnostics agent uses a Q-table to find the next cell as it moves through the maze. The Q-table represents the possibility of a successful outcome-action at any state, based on whether or not a reward is accrued during the training phase. The Q-table can be updated during each round of training. FIG. 8 illustrates an example final Q-table 800 for the solved maze 500. As indicated in Q-table 800, at state (1, 1), which is the initial state, a reward can only be accrued by moving to right. This is because the maze does not allow moving to the left (the initial cell is already leftmost in the maze) and moving to another component or microservice in the maze does not reveal a state with a log message that is valid in terms of its timestamp. The consequence of this first row of Q-table 800 is illustrated in the solution paths 602, 702 of FIGS. 6 and 7. In state (3, 3), however, Q-table 800 indicates that actions of moving either down or right both accrue rewards, indicating that either of these moves may be valid. This row of Q-table 800 thus indicates that there are at least two solution paths to maze 500. In terms of the telephony application being troubleshot in the illustrated examples, the significance of the multiple different solution paths is that different types of calls can have different connecting paths. A final Q-table can be used to replay a failure case in the detecting phase to find a potential cause of a problem.

The detecting phase can be performed by the self-diagnostics detector 108, 208, or 308 to detect the root cause of a problem. As shown in FIG. 9, a failure case 902 may, for example, terminate at cell (2, 4) of maze 500 (the /qcall state of the Call Engine microservice). The self-diagnostics detector may replay the failed call in the maze and note that first solution path 602 does not traverse cell (2, 4). The applicability of this solution 602 to the problem can thus be eliminated. The self-diagnostics detector (e.g., detector 208, 308) can thus move on to replay the failed call over the second found solution path 702, and may thereby note that the first failure point—the first point at which the solution path 702 diverges from the failure case 902—is at cell (3, 3), the new branch state of the Sip Proxy microservice. The self-diagnostics detector may thus detect that the failure reason is that it the failure case is missing "new branch" in the Sip Proxy microservice.

Figure 10:
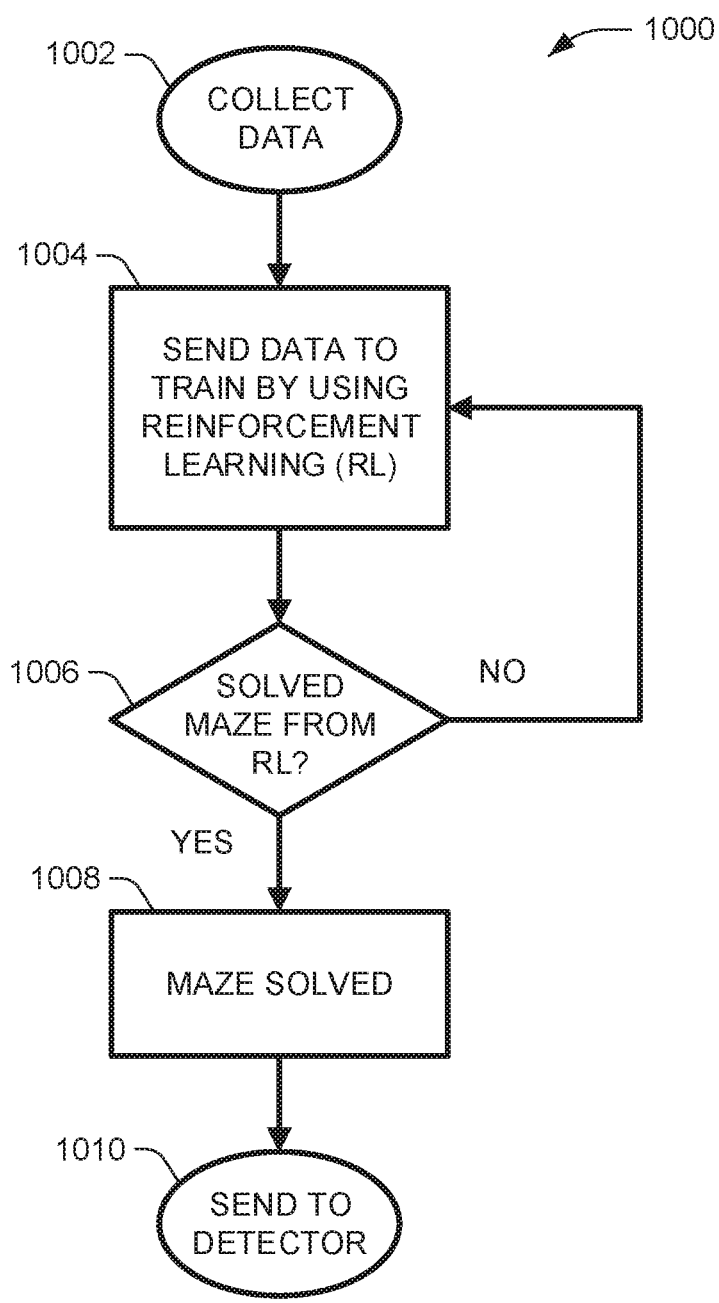
FIG. 10 is a flow chart of an example method of training to obtain a solved maze.

Thus, the self-diagnostics detector can use the Q-table 800, which contains a trained-possibility (the next successful action to replay), to quickly find an applicable solution path and determine a divergence point to report as a potential cause of failure. In the illustrated example, as can be seen from Q-table 800, at cell (2,4), the trained possibility is to move down. By comparing with a successful path, the self-diagnostics detector should reach cell (3, 3) to identify a potential cause of the problem as the new branch state of the Sip Proxy microservice. FIG. 10 shows an example method 1000 of training to obtain a solved maze. Data pertaining to the application domain of a cloud-based software application is collected 1002 (e.g., from logs or a database) and sent to train 1004 by using reinforcement learning. The training can proceed as described above and/or according to known methods, and can be performed, for example, by the self-diagnostics agent 104, 204, or 304 of FIG. 1, 2, or 3, respectively. If it is determined 1006 that the maze is not solved, training 1004 is repeated until the maze is solved 1008 and the found solution path(s) are sent to the self-diagnostics detector (e.g., detector 108, 208, or 308 in FIG. 1, 2, or 3, respectively).

Figure 11:
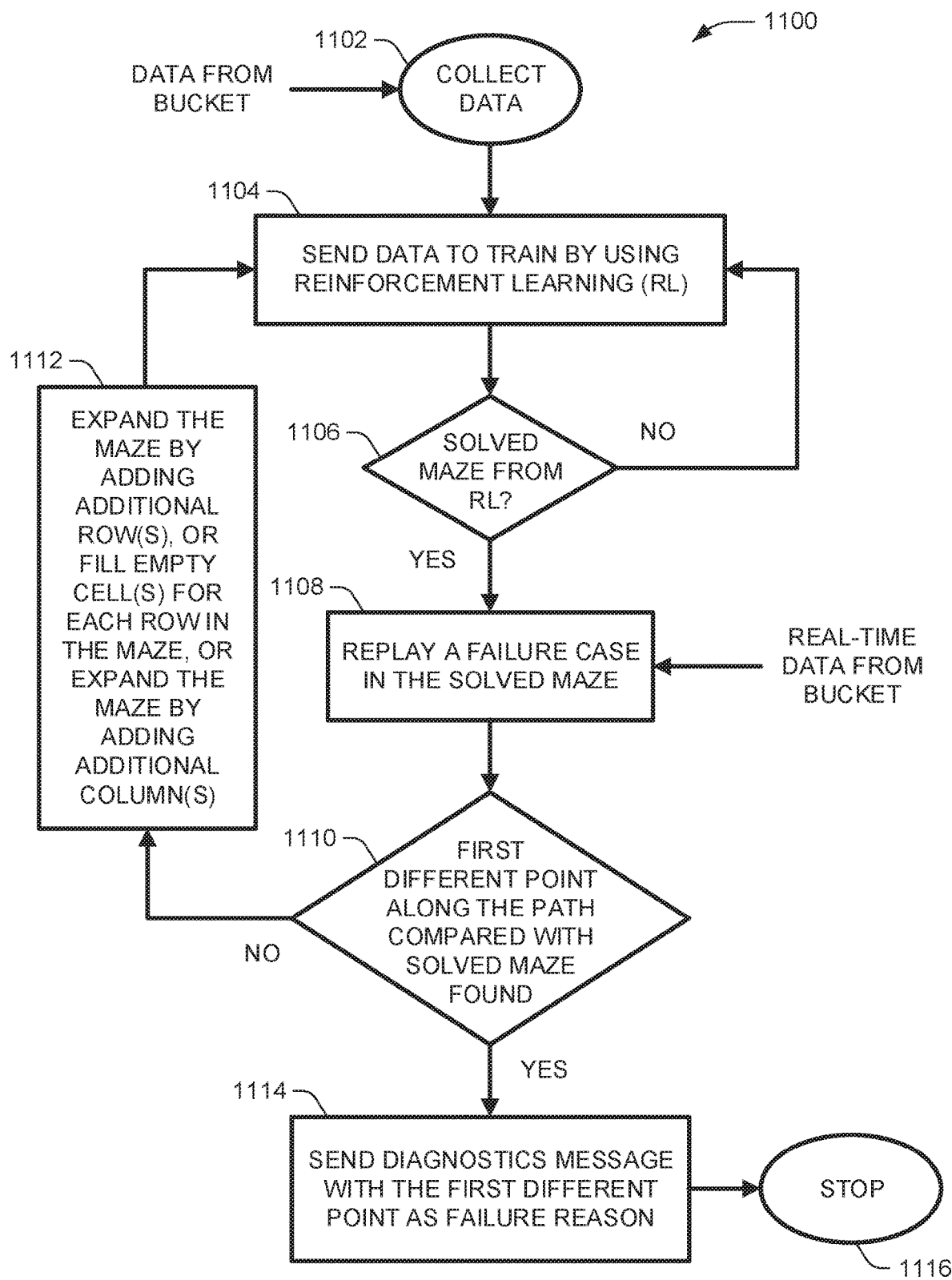
FIG. 11 is a flow diagram of an example method of maze-driven self-diagnostics.

FIG. 11 shows an example method 1100 of maze-driven self-diagnostics, fully encompassing the training method 1000 of FIG. 10. Data pertaining to the application domain of a cloud-based software application is collected 1102 from a "bucket" (e.g., from logs or a database) and sent to train 1104 by using reinforcement learning. The training can proceed as described above and/or according to known methods, and can be performed, for example, by the self-diagnostics agent 104, 204, or 304 of FIG. 1, 2, or 3, respectively. If it is determined 1106 that the maze is not solved, training 1104 is repeated until the maze is solved. A failure case (e.g., a failed call, in the case of a telephony application) is replayed 1108 in the solved maze, which may be done by a self-diagnostics detector (e.g., detector 108, 208, or 308 in FIG. 1, 2, or 3, respectively). Based on there being found 1110 a different point along the failure path as compared with the solved maze, a diagnostics message can be sent (as, for example, by message generator 220 or 320) and the troubleshooting process concludes 1116.

If, however, no different point is found when a failure path is compared to the applicable solution path(s), this means the existing knowledge is not enough to determine the reason of the failure, and the maze can be altered 1112 before retraining and resolving 1104. If not all of the utilized components or microservices are already included as rows in the maze, the maze can be expanded with one or more additional rows corresponding to one or more selected components or microservices. The additional one or more components or microservices can be incrementally selected for inclusion according to some quantified or labeled priority. If, however, there are no more components or microservices to add to the maze as additional rows, then one empty cell can be filled for each of the row in the maze, or, if there are no empty cells left in any given row, the maze may be expanded by, for example, adding one column to the maze before filling in an empty cell in the previously full row, and repeating the training 1104 to re-solve the revised maze with the historical data. This cycle of maze expansion can iteratively repeat until a probable point of failure is found 1110 and reported 1114. In this way, the method 1100 acquires new knowledge by filling empty cells or expanding a column. In some examples, method 1100 may alternatively or in addition expand 1112 the maze by adding a new row to the maze, filling it with states of a previously unconsidered component or microservice.

Any of the above systems or methods can include a data preparation step or component (not shown), which can be provided to label state data prior to insertion into a maze. For example, when putting logging events into a maze, each state in each component or microservice can be numerically labeled. For example, for the starting state (1, 1) in maze 500, a logging message can be assigned the numerical label "1000", whereas the state (1, 3) can be assigned the numerical label "3000", permitting new states to be inserted between these two states with numerical labels between "1000" and "3000". In the maze-driven troubleshooting systems and methods described herein, a global identifier can be used to associate components or microservices to link data. Usually, there is a correlation ID among components or microservices. The present systems and methods can use either this correlation ID or global call ID to link the data. The same global call ID or correlation ID from one component or microservice indicates one test case.

A troubleshooting system such as system 100, 200, or 300 can perform automated diagnosis of a new case with new knowledge. For example, real-time failure data may indicate "call recording failed," which is a different error than in the example of the failure to connect a call examined above with reference to FIG. 9. Examining the two solved paths 602 and 702 shown in FIGS. 6 and 7, respectively, the detector 208 or 308 will not be able find the difference between an actual failure path and the solved paths 602, 702 because the "Recording Service" microservice is not in the maze 500, nor is there any state related to recording in either solved path. In accordance with the method 1100 illustrated in the flow chart FIG. 11, a recognition that the maze lacks a needed component or service or state means that the maze needs to be expanded 1112. The method 1100 prescribes expanding the rows of the maze first, which means adding or more new microservices to the maze prior to attempting to add states to the maze or expand the maze with additional columns.

By looking at the provided list of all microservices in the target application, an example of which is provided above in Table 1, the troubleshooting system can decide to expand the maze to include the "Recording Service" at 1112, because the "Recording Service" is not already part of the maze 500. The troubleshooting system can then look to the applicable state table, provided above in Table 3, to load the first few states of the new component or microservice (in this case, "Recording Service") into the maze.

TABLE 4

New microservice and states to be added into maze 500

| Recording Service | CreateRecordingParticipant | RecordingParticipantJoined |
|---|---|---|

Having thus added a new microservice and a few states to the maze, the system has new knowledge of a microservice, "Recording Service", with new states in the maze. In accordance with method 1100, at this point, the self-diagnostics agent 104, 204, or 304 commences re-training 1104 to find a new solution path through the enlarged maze.

Having found a new solved path in the maze, the detector 208 or 308 of the diagnostics system can attempt to re-diagnose the failure. If the detector 208 or 308 is still unable to determine the cause of the failure, the maze generator 210 or 310 will again expand the maze, this time by expanding columns in the maze, which in the present example means to include a new state into the maze for every microservice included as a row in the maze. Among any other states added to the maze for other microservices, the maze will now be updated to include the next not-yet-included state of the "Recording Service" microservice from Table 3, namely, "Recording Started".

TABLE 5

Another state of "Recording Service" to be added into maze 500

| Recording Service | RecordingStarted |
|---|---|

Now the self-diagnostics agent 204 or 304 will again be re-trained 1104 to solve the newly revised maze. The re-training may effectively recognize that in a new solved path, for a successful recording, all the three "Recording Service" states must be in the solved path. At this point, the detector 208 or 308 can successfully find 1110 the first difference between the solved path and the failure case "call recording failed", no matter whether the failure was caused by missing the state "RecordingParticipantJoined" or "Recording-Started". The message generator 220 or 320 can retrieve from Table 3 the description of the state identified by detector 208 or 308 as the failure reason and thus to send 1114 a diagnostics message that can include, for example, an expression of the failure reason, such as "missing 'recording participant joined'".

In the above-described self-diagnostics process, only the initial configuration of the troubleshooting system, through the provision of a list of all components or microservices in the target application, requires the interaction of a person. The troubleshooting system 100, 200, or 300 may be configured to perform all the other aspects of the troubleshooting process automatically. The expanding of a maze with new states and the acquisition of new knowledge through the solving of expanded mazes are done by using method 1100 as illustrated in FIG. 11.

Figure 13:
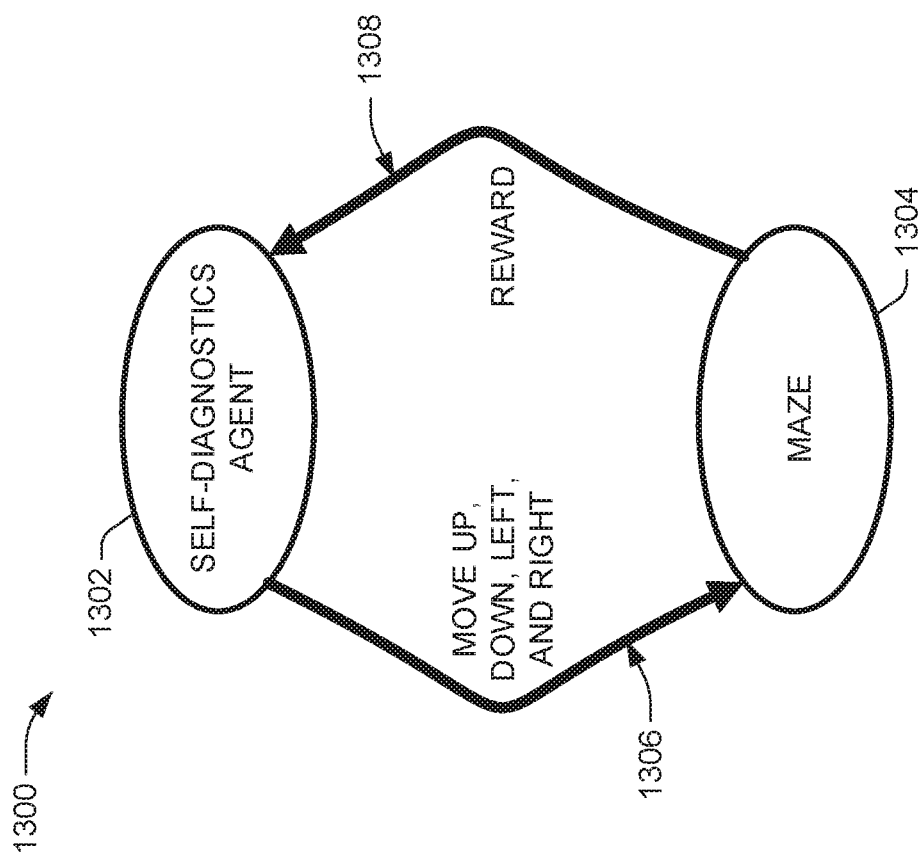
FIG. 13 illustrates a concept model for maze-driven reinforcement learning in a self-diagnostic system or method.
Figure 12:
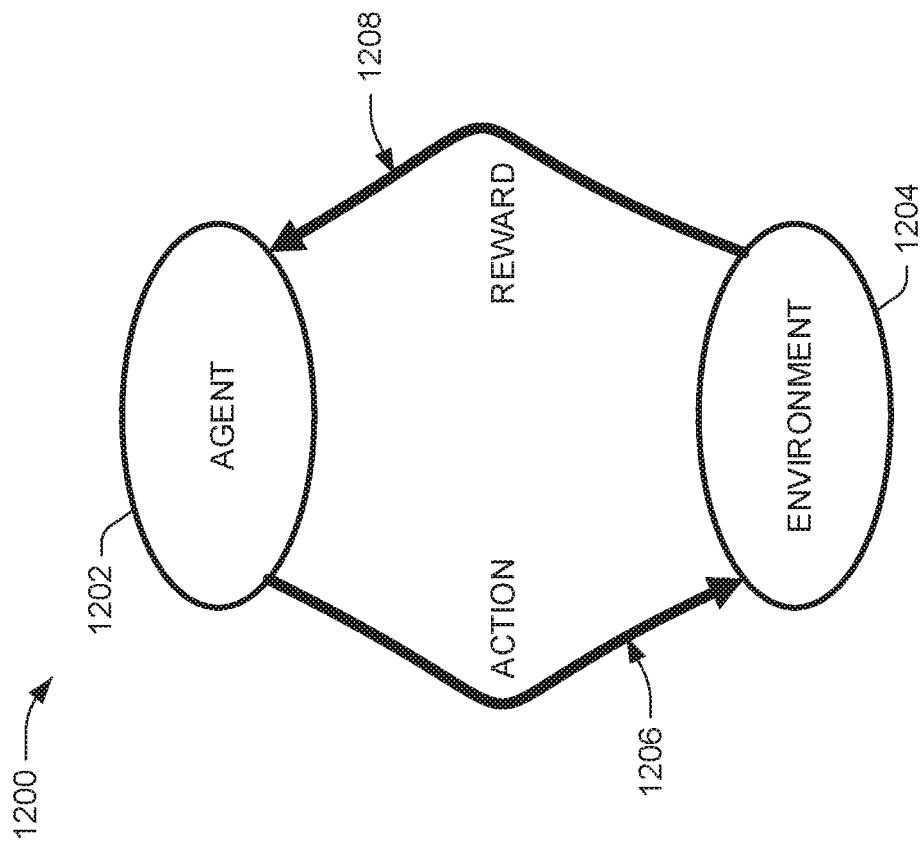
FIG. 12 illustrates a general reinforcement learning theory model.

FIG. 12 illustrates a general reinforcement learning theory model 1200. Under the given environment 1204, an agent 1202 performs an action 1206 to get rewards 1208. The agent 1202 can try repeatedly to get maximum rewards 1208, in order to find a goal in the given environment 1204. FIG. 13 illustrates a concept model 1300 equivalent to general model 1200, which is particularized to the problem of maze-based software self-diagnostics. In model 1300 of FIG. 13, the given environment in the stated context is a maze 1304 composed of states of components or microservices. As its actions, a self-diagnostics agent 1302 moves up, down, left, and right 1306 on the maze 1304 repeatedly, to collect maximum rewards 1308 in order to find a path in the maze 1304. A reinforcement learning algorithm can use a Q-table to help to find a path. Various utility tools and services are available to provide RL training in different contexts and environments. The systems and methods described herein model a self-diagnostics problem in a maze-based RL model to automate troubleshooting tasks.

The systems and methods described herein can use reinforcement learning to solve a maze that models an application domain of a target software application to troubleshoot the target application. The troubleshooting methods and systems can be made to automatically trigger upon a detected failure and thus can automatically find and alert a developer or support professional not only to the fact of the occurrence of the failure but also to the probable cause of the failure, reducing human labor needed to troubleshoot problems in complicated software applications (e.g., cloud-based applications) for which, moreover, human troubleshooting may not be practicable in view of the complexity of the software application (e.g., cloud-based software application) and the limits of human expertise and knowledge accumulation. The presently described systems and methods thus offer the benefits of substantial time and money savings and allow for failure reasons in complex software applications to be determined without human intervention. The presently described systems and methods further offer the ability to troubleshoot in scenarios where third-party components or microservices may have been added to a system, the existence or functioning of which may be unfamiliar to human support personnel.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A method of troubleshooting a computing application in a distributed computing environment, the method comprising:

modeling an application domain of the computing application as a two-dimensional array of cells, a first dimension of the array representing components or microservices of the application domain, and a second dimension of the array representing states of the components or microservices, the array including paths between pairs of cells in the array, wherein the modeling includes automatically generating the array by extracting information from one or more log files associated with each component of computing application;

defining a troubleshooting goal as a target state of the application domain, the target state corresponding to a target cell in the array;

providing an initial state of the application domain, the initial state corresponding to an initial cell in the array;

using a reinforcement-learning-trained machine-learning algorithm to determine at least one solution path in the array between the initial cell and the target cell;

comparing failure data with the solution path to determine a failure point along the solution path, wherein the failure point indicates a failed component or microservice; and automatically re-writing or replacing the failed component or microservice.

2. The method of claim 1, further comprising generating a diagnostic message indicating the failure point as a failure reason or a solution suggestion responsive to the troubleshooting goal.

3. The method of claim 1, further comprising:
comparing failure data with the solution path;
based on the comparison not determining a failure point along the solution path, expanding the array in at least one of the first or second dimension by one or both of adding one or more components or microservices to the array or by adding to the array one or more states of the components or microservices in the array;
using the machine-learning algorithm to determine at least one new solution path in the expanded array between the start cell and the target cell.

4. The method of claim 3, further comprising comparing the failure data with the new solution path to determine a failure point along the new solution path.

5. The method of claim 4, further comprising generating a diagnostic message indicating the failure point as a failure reason or solution suggestion responsive to the troubleshooting goal.

6. The method of claim 3, further comprising iteratively repeating comparing the failure data with the new solution path, not determining a failure point along the new solution path, expanding the array, and determining another at least one new solution path, until a failure point is determined.

7. A self-diagnostics system for troubleshooting a computing application in a distributed computing environment, the self-diagnostics system comprising one or more computer processors coupled to a non-transitory memory storing instructions configured to, when executed by the one or more computer processors:
model an application domain of the computing application as a two-dimensional array of cells, a first dimension of the array representing components or microservices of the application domain, and a second dimension of the array representing states of the components or microservices, the array defining paths between pairs of cells in the array,
wherein the modeling includes automatically generating the array by extracting information from one or more log files associated with each component of the computing application;
define a troubleshooting goal as a target state of the application domain, the target state corresponding to a target cell in the array;
provide an initial state of the application domain, the initial slate corresponding to an initial cell in the array;
apply a reinforcement-learning-trained machine-learning algorithm to determine at least one solution path in the array between the start cell and the target cell;
compare failure data with the solution path to determine a failure point along the solution path, wherein the failure point indicates a faded component or microservice; and
automatically re-write or replace the failed component or microservice.

8. The self-diagnostics system of claim 7, wherein the instructions are further configured to generate a diagnostic message indicating the failure point as a failure reason.

9. The self-diagnostics system of claim 7, wherein the instructions are further configured to:
compare failure data with the solution path;
based on the comparison not determining a failure point along the solution path, expand the array in at least one of the first or second dimension by one or both of adding one or more components or microservices to the array or by adding to the array one or more states of the components or microservices in the array;
use the machine-learning algorithm to determine at least one new solution path in the expanded array between the start cell and the target cell.

10. The self-diagnostics system of claim 9, wherein the instructions are further configured to compare the failure data with the new solution path to determine a failure point along the new solution path.

11. The self-diagnostics system of claim 10, wherein the instructions are further configured to generate a diagnostic message indicating the failure point as a failure reason or solution suggestion responsive to the troubleshooting goal.

12. The self-diagnostics system of claim 9, wherein the instructions are further configured to iteratively repeat comparing the failure data with the new solution path, not determining a failure point along the new solution path, expanding the array, and determining another at least one new solution path, until a failure point is determined.

13. A non-transitory computer-readable medium storing instructions that, when executed by a processor, cause the processor to:
model an application domain of a computing application in a distributed computing environment as a two-dimensional array of cells, a first dimension of the array representing components or microservices of the application domain, and a second dimension of the array representing states of the components or microservices, the array defining paths between pairs of cells in the array,
wherein the modeling includes automatically generating the array by extracting information from one or more log files associated with each component of the computing application;
define a troubleshooting goal as a target state of the application domain, the target state corresponding to a target cell in the array;
provide an initial state of the application domain, the Initial state corresponding to an initial cell in the array;
use a reinforcement-learning-trained machine-learning algorithm to determine at least one solution path in the array between the start cell and the target cell;
compare failure data with the solution path to determine a failure point along the solution path, wherein the failure point indicates a failed component or microservice; and
automatically re-write or replace the failed component or microservice.

14. The computer-readable medium of claim 13, wherein the instructions are further configured to generate a diagnostic message indicating the failure point as a failure reason.

15. The computer-readable medium of claim 13, wherein the instructions are further configured to:
compare failure data with the solution path;
based on the comparison not determining a failure point along the solution path, expand the array in at least one of the first or second dimension by one or both of adding one or more components or microservices to the array or by adding to the array one or more states of the components or microservices in the array;
use the machine-learning algorithm to determine at least one new solution path in the expanded array between the start cell and the target cell.

16. The computer-readable medium of claim 15, wherein the instructions are further configured to compare the failure data with the new solution path to determine a failure point along the new solution path.

17. The computer-readable medium of claim 15, wherein the instructions are further configured to iteratively repeat comparing the failure data with the new solution path, not determining a failure point along the new solution path, expanding the array, and determining another at least one new solution path, until a failure point is determined.

* * * * *